Dec. 17, 1968    R. C. HILL    3,417,243
METHOD AND APPARATUS FOR X-RAY FLUORESCENCE GAUGING OF A HIGHER
ATOMIC NUMBER SELECTED ELEMENT IN A COATING ON A BASE
Filed Oct. 28, 1965
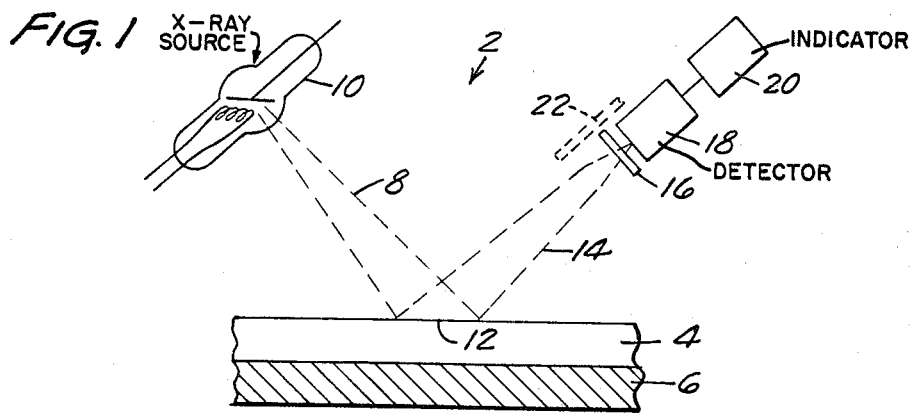
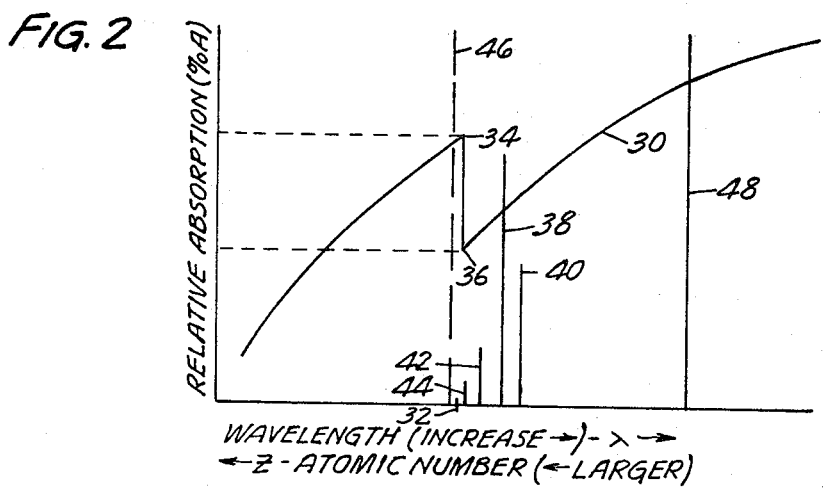
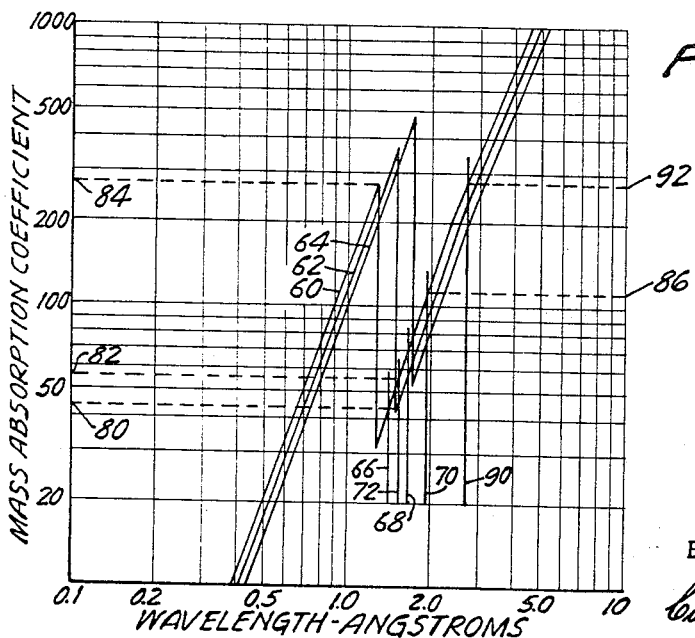
INVENTOR.
ROBERT C. HILL
BY
Carpenter, Kinney & Coulter
ATTORNEYS United States Patent Office 3,417,243
Patented Dec. 17, 1968

3,417,243
METHOD AND APPARATUS FOR X-RAY FLUORESCENCE GAUGING OF A HIGHER ATOMIC NUMBER SELECTED ELEMENT IN A COATING ON A BASE
Robert C. Hill, St. Paul, Minn., assignor to Minnesota Mining and Manufacturing Company, St. Paul, Minn., a corporation of Delaware
Filed Oct. 28, 1965, Ser. No. 505,479
13 Claims. (Cl. 250—83.3)

ABSTRACT OF THE DISCLOSURE

A method and apparatus for X-ray fluorescence gauging of a selected element in a coating having an atomic number higher than the atomic number of any other element in a coating and base is shown. The nondispersive X-ray fluorescence gauge shown herein irradiates a localized area of a coating on the base with an X-ray beam having an excitation potential sufficient to excite the coating element to emit fluorescent radiation at its characteristic wavelengths together with background radiation and backscattered X-ray beam radiation, uses a single passive filter having a predetermined thickness and X-ray absorption wavelength which is slightly shorter than at least one of the characteristic wavelengths of the fluorescent radiation of the selected element for selectively transmitting all of the radiation and which uses a detector positioned relative to the filter for receiving the selectively transmitted fluorescent radiation and for producing an output signal which is substantially proportional to the intensity of the fluorescent radiation intensity of the coating element.

This invention relates to X-ray fluorescence gauging and more particularly to a method and apparatus for selectively measuring fluorescent radiation intensity. This invention is useful in measuring mass per unit area of a coating on a base by means of X-ray fluorescence.

In metrology, X-ray fluorescence has been used for measuring thickness of a coating on a substratum or base. The coating, being measured for thickness may be formed to contain a coating element which is several atomic numbers lower than the element contained in the base. Then an X-ray beam is used to excite the coating element to fluorescence to emit characteristic radiation of the coating element. However, the X-ray beam could also excite some elements of the base to fluorescence to emit characteristic radiation of the base elements. A detector, which may be a proportional counter or scintillation counter, transforms the fluorescent radiation into electrical impulses whereupon a pulse amplitude discriminator transmits as an output signal only electrical impulses derived from the fluorescent radiation of the coating element, while rejecting the incidental electrical impulses derived from those base elements excited to fluorescence. The intensity of the coating element fluorescent radiation, or the rate of electrical impulses produced as an output by the pulse amplitude discriminator, is related to coating thickness.

Conversely, when X-ray fluorescence has been used for measuring thickness of a coating which contains a coating element that is several atomic numbers higher than the element contained in the base, the X-ray beam excitation of the coating element to fluorescence will inherently excite all of the base elements to fluorescence. A detector and a pulse amplitude discriminator has been used to transform the fluorescent radiation from the coating element in this situation into electrical impulses which are related to coating thickness. Insofar as is known, this system has been the only non-dispersive system for continuous process analysis of a coating thickness wherein the atomic number of the coating element is higher than any element in the base. However, this system is relatively slow in operation as compared to the teaching of this invention, and it is not particularly suitable when the atomic number of the coating element is close to the atomic number of base elements.

When the coating element is one, two or a few atomic numbers lower than any element contained in the base, the coating thickness has been measured by an X-ray fluorescence system employing a filter. Here, an X-ray beam is used which excites both the coating element and the base element to fluorescence of the type wherein the coating element fluorescent radiation is in a background of fluorescent radiation of the base elements. The filter which is positioned before the detector functions to filter out or attenuate fluorescent radiation of the base elements and to transmit relatively more of the coating element fluorescent radiation to the detector. The coating element fluorescent radiation intensity or rate of electrical impulses, produced as an output by the detector, is related to coating thickness. The filter selection in this situation has been limited to a filter element whose atomic number is equal to or greater than that of the coating element and less than that of the base element.

The present invention relates to X-ray fluorescence gauging for measuring amount or mass per unit area of a coating on a base wherein the coating has an element which is at least one atomic number higher than any other element in the coating and base. In certain applications, the mass per unit area of the coating element can be related to the thickness of a coating on a base. The known X-ray fluorescent measuring techniques fail to suggest any rapidly acting and reliable non-dispersive measuring system which characteristically has a filter for selectively measuring fluorescent radiation intensity of a coating on a base wherein the coating element is only a few, even one or two, atomic numbers *higher* than any other element in the base and coating. The new system of this invention has an improved signal-to-noise ratio over any proven prior art system over the entire range of atomic number differences.

The present invention provides a method and apparatus which is capable of always selectively measuring the fluorescent radiation from the coating element, which is the element having the highest atomic number, relative to other elements or materials in the coating and the base. This is accomplished by using a filter of a preselected element, with the filter having a predetermined thickness and an X-ray absorption edge wavelength slightly shorter than at least one of the characteristic wavelengths of the fluorescent radiation by the coating element. The selected filter, being of a predetermined thickness, always transmits the coating element fluorescent radiation with only a known percent absorption. Simultaneously, background fluorescent radiation from all other coating and base elements produced when excited by the primary X-ray beam, and backscattered primary X-ray beam radiation are absorbed by the selected filter with a greater percent absorption than the radiation from the coating element. A filter of selected thickness and absorption coefficients is used to establish a substantially optimum ratio between the transmitted fluorescent radiation and the transmitted background and backscattered radiation at the excitation potential or voltage of the X-ray beam, such that the transmitted fluorescent radiation is at a predetermined higher level than the combination of the transmitted background and backscattered radiation.

A known X-ray fluorescent system using a detector operatively coupled to a pulse amplitude discriminator becomes insensitive when the difference between the coating element and elements of the base is less than a few atomic numbers (e.g., less than 3, 4 or 5 atomic numbers). Additionally, the combination of a detector and a pulse amplitude discriminator has many limitations, the most notable being the following: (1) a relatively slow response time in receiving a predetermined number of radiation counts to produce an output signal having a resolution which is statistically acceptable for measurement; and (2) a low percentage operation efficiency because the detector is called upon to detect directly the coating element fluorescent radiation which is only a small portion of the total radiation. The inherent limitations of such an X-ray fluorescence system limit its use and make it unsuitable for controlling a high speed continuous process for measuring either thickness or mass per unit area of a coating on a base, particularly wherein the coating is formed by using a material having essentially uniformly distributed therethrough an element which is only one, two or a few atomic numbers higher than any other element in the coating and base.

In known X-ray fluorescence system, a filter has only been used when the coating element is one which is one, two or a few atomic numbers lower than the base element. In such applications, the filter provides satisfactory operation since the characteristic wavelength of the base element fluorescent radiation is always shorter than the characteristic wavelength of the coating element fluorescent radiation. However, if the difference between the coating and base elements is greater than a few atomic numbers (approximately the condition wherein a combination detector and a pulse amplitude discriminator would be employed), the filter becomes inoperative and filters out the desired coating element fluorescent radiation while selectively transmitting the undesired base element fluorescent radiation.

Such a filter element, as used in known fluorescence X-ray systems, must have an absorption edge wavelength which is shorter than the characteristic wavelengths of the desired coating element fluorescent radiation, but longer than the characteristic wavelengths of the undesired base element fluorescent radiation. A filter having characteristics meeting these requirements is attainable only when the coating element has the lowest atomic number. When the difference in atomic number between the coating element and the base element or elements is more than a few atomic numbers, the above described filter is completely inoperative in that the coating element fluorescent radiation is transmitted with greater percent absorption than the percent absorption of the base element fluorescent radiation.

None of the known non-dispersive X-ray fluorescence systems have been utilized for measuring fluorescent radiation from a coating element which is one, two or a few atomic numbers larger than the base element. The present invention is capable of providing such a measurement. The effectiveness of the X-ray fluorescence gauge of the present invention increases as a function of the difference in atomic number between the coating element and the next highest but lower numbered element in the coating and base.

In addition to advantages previously noted, the present invention permits selection of a desired ratio of fluorescent radiation to background and backscattered radiation and allows selection of optima combinations of filter thickness and X-ray beam excitation potentials to produce the desired ratio.

The above and further advantages of the present invention will become fully apparent when considered in light of the following detailed description which refers to the accompanying drawing wherein:

FIGURE 1 is a diagrammatic illustration of apparatus for performing X-ray fluorescence gauging;

FIGURE 2 is a graphical representation of a curve illustrating the relationship of X-ray absorption of a filter element including typical K series characteristics radiation of the same element at its characteristic wavelength; and FIGURE 3 is a graphical representation of a curve plotted on a log-log scale illustrating the X-ray absorption of a filter comprising either the element of zinc, nickel or iron including the characteristic wavelength of the $K\alpha$ characteristic radiation of each element.

Referring now to FIGURE 1, the general principles of the invention will now be described. A non-dispersive X-ray fluorescence gauge noted generally as 2 is used for measuring the mass per unit area of a coating 4 on a substratum or base 6.

The mass per unit area of a coating on a base may or may not be proportional to the coating thickness depending on the application. The coating may be formed by using a coating material having essentially uniformly distributed therethrough an element with an atomic number higher than any other element in said coating material and said base.

Alternately, if the mass per unit area of the coating element within the coating material is crucial, the thickness of the binder or other coating material may vary (due to an independent variable such as the amount of organic binding material, for example), while the mass per unit area of the coating element is maintained constant.

Still further, the coating material may contain a known amount of an element as a trace element wherein the mass per unit area of the trace element is proportional to coating thickness. In some applications, the coating material may be a single element applied directly to the base. In such applications, the mass per unit area of the coating element would be directly proportional to coating thickness. In the present invention, the coating has an element (i.e., coating element) with an atomic number which is at least one atomic number higher than any other element in said coating and base.

The coating material may include a coating element, such as zinc, nickel or iron, and a known organic binding material. The coating material is applied to a base, which base may be either a single element which is at least one atomic number lower than the coating element or a base material having all elements which are at least one atomic number lower than the coating element.

The X-ray fluorescene gauge 2 includes an X-ray beam 8 emanating from an X-ray source 10. The X-ray beam 8 is positioned to irradiate a localized area 12 of the coating 4 on the base 6. For purpose of example, the specimen may comprise a coating material, having zinc essentially uniformly distributed therethrough, on an non-metallic base. Alternatively, the base could be either a metallic element or a combination of non-metallic and metallic elements, the only requirement being that the atomic number of the heaviest element be at least one atomic number lower than the coating element, or zinc in this example.

The X-ray beam 8 has an excitation potential sufficient to excite the coating element (i.e. the element of the coating having the highest atomic number) to emit fluorescence of said coating element at its characteristic wavelength. The intensity of the fluorescent radiation is proportional to the mass per unit area of the coating element in the localized area 12 of the coating 4. The X-ray beam 8 simultaneously excites all of the other elements in the coating material and base producing background fluorescent radiation from said other elements. Simultaneously, backscattered X-ray beam radiation is produced by the coating 4 and base 6 from the primary X-ray beam 8. The fluorescent radiation from the coating element, the background fluorescent radiation from the other elements in the coating material and base and the backscattered X-ray beam radiation is shown generally as 14.

A single passive filter 16 comprises a preselected element which non-dispersively filters out most of the radiation 14. Non-dispersively filtering means that the radiation which passes through the filter is passed or transmitted at its various wavelengths without altering the direction of propagation of the radiation as a function of its wavelength.

The filter 16 is selected to have a predetermined thickness and an X-ray absorption edge wavelength slightly shorter than the characteristic wavelength of the fluorescent radiation emitted by the coating element. The filter predetermined thickness is selected such that the filter 16 selectively transmits fluorescent radiation from the coating element at its characteristic wavelength with a known percent of absorption and the background and backscattered radiation with a greater precent of absorption to establish a desired ratio therebetween for the particular excitation potential or voltage of the X-ray beam 8. The filter 16 is positioned at an angular displacement, which is not crucial, relative to the X-ray beam 8, and is placed to interrupt the fluorescence from the irradiated localized area 12 of the coating 4 on its way to detector 18.

The detector 18 is positioned relative to the filter 16 for receiving the transmitted fluorescent radiation, picking up particularly the strongest fluorescence which is from the coating element. The detector 18 produces an output signal which is substantially proportional to the fluorescent radiation intensity from the coating element. The output signal from the detector 18 is substantially representative of the coating element per unit area in the coating 4 on the base 6 being measured by the gauge 2. The output from the detector is applied to an indicator 20 for readout, comparison and the like.

The indicator 20 would typically be used for comparing the output signal received from the detector 18 with a reference signal produced from a reference coated base having a known amount of coating element per unit area. The reference signal may, for example, be a standardizing signal derived from a reference coated base and set in the indicator 20. The indicator 20 would then determine the variance of mass per unit area of the coating element with respect to the reference signal of the reference coated base.

Optionally, a shield 22 could be disposed between the X-ray beam 8 and the filter 16 to prevent primary beam radiation scattered by the air column adjacent to the X-ray source 10 from reaching the detector 18, thereby insuring that only fluorescent radiation of the coating element and only background and backscattered radiation impinge upon said detector.

In FIGURE 2, a typical X-ray absorption curve 30 is illustrated for a typical element. The abscissa is wavelength, increasing in value from the origin along the axis of the abscissa, and the ordinance is the relative absorption in percent (percent A), increasing along its axis from the origin. Since the atomic number of an element is inversely proportional to the wavelength of its characteristic radiation, the larger the atomic number of the element, the shorter its characteristic wavelength will be. The absorption curve 30 has an X-ray absorption edge wavelength which occurs at an absorption edge wavelength having a particular known wavelength 32. At the absorption edge wavelength 32, the relative absorption of the element drops from a peak point 34 to a valley point 36. The relative absorption of the element thereafter generally increases as a function of wavelength as illustrated by the absorption curve 30.

If for example, the absorption curve 30 illustrated the X-ray absorption of zinc having an atomic number of 30, the zinc X-ray absorption edge wavelength would occur at 1.283 Angstroms wavelength (as at point 32). Any excitation potential above 9.657 kev. is capable of exciting zinc to fluorsecence causing the emission of its fluorescent radiation. When zinc is excited by an X-ray beam having an excitation potential sufficient to excite it to fluorescence, its K series fluorescent radiation spectra will be generated having a $K\alpha_1$, a $K\alpha_2$, a $K\beta_1$ and a $K\beta_2$ fluorescent radiation, each occurring at their characteristic wavelengths and being longer wavelengths than the zinc absorption edge wavelength. For example, the zinc $K\alpha_1$ fluorescent radiation occurs at a 1.435 Angstroms wavelength, the $K\alpha_2$ occurs at 1.439 Angstroms wavelength, the $K\beta_1$ occurs at 1.295 Angstroms wavelength and the $K\beta_2$ occurs at 1.284 Angstroms wavelength.

Typical K series fluorescent radiation spectra, of the element (e.g. zinc) illustrated by absorption curve 30, are illustrated on the graph of FIGURE 2 in combination with the absorption curve 30. Lines 38, 40, 42 and 44 respectively correspond to the $K\alpha_1$, the $K\alpha_2$, the $K\beta_1$ and the $K\beta_2$ fluorescent radiation lines of the element. Line 38 illustrates that the $K\alpha_1$ fluorescent radiation is of the strongest intensity. The remaining K series fluorescent radiation lines have lower intensity levels and occur at shorter characteristic wavelengths.

Dashed line 46, on FIGURE 2, illustrates a typical characteristic line from a source having an excitation potential sufficiently high to excite the illustrated element and any other element which is lower in atomic number to fluorescence. Fluorescent radiation from the other elements having a lower atomic number would occur at a longer characteristic wavelength. For example, line 48, which is representative of such a fluorescent radiation, when compared to both the K series lines 38 to 44 and the absorption edge wavelength 32, always occurs at a longer wavelength. In comparing the relative absorption which would occur for the K series lines 38 to 44, the absorption edge at wavelength 32, and line 48 at its characteristic wavelength, the element illustrated by absorption curve 30 would selectively transmit its fluorescent radiation at its characteristic wavelength with a known percent of absorption and the fluorescent radiation of a lighter (or lower numbered) element at its longer characteristic wavelength, represented by line 48, with a greater percent of absorption.

As explained in connection with the absorption curve 30 of FIGURE 2, if the coating element fluorescent radiation occurs at a wavelength which is shorter than that of the next highest element in the coating material or base, the difference in percent relative absorption between the two selectively transmitted fluorescent radiations is such that a ratio of the transmitted fluorescent radiation of the coating element to the transmitted radiaion from the other elements of the coating and base can be established; and the ratio would increase as a function of the difference, as the difference in atomic number becomes greater between the coating element and the lower atomic numbered elements in the coating and base.

In the X-ray fluorescence gauge 2 of FIGURE 1, the filter 16 must be selected such that an optimum ratio, which is usually not a maximum ratio, exists between the transmitted fluorescent radiation of the coating element and the transmitted background and backscattered radiation at the excitation potential of the X-ray beam for the thickness and absorption coefficients of the filter. Thus, certain variables must be taken into account in selecting filter 16. These variables include the intensity of the gross signal comprising fluorescent radiation from the coating element, background fluorescent radiation from the other coating and base elements and the backscattered X-ray beam radiation. Additionally, the detector noise level must be considered, and the intensity of the fluorescent radiation from the coating element must be of sufficient intensity to be above the noise level of the detector so as to be discernible. On the other hand, the fluorescent radiation intensity level must be below the saturation level of the detector. The excitation potential of the X-ray beam must also be considered. Additionally, the filter thickness is important since the amount of radiation absorbed is an expotential function of the filter absorption coefficient, for each radiation, and the filter thickness.

Individual curves of the ratio of the net signal produced from fluorescent radiation from the coating element to the detector noise level can be plotted as a function of excitation potential of the X-ray source and the filter thickness. Additionally, a family of curves can be plotted for the ratio of fluorescent radiation of the coating element to the background and backscattered radiation as a function of excitation potential of the X-ray source and the filter thickness. From these curves, an area of optimum ratios of operation is determinable.

The intensity $I_c$ of the fluorescent radiation from the coating element transmitted by the filter element is a function of the intensity $I_{oc}$ of fluorescent radiation from the coating element available at the surface of the filter, the absorption coefficient $\mu_c$ of the filter for that fluorescent radiation at its characteristic wavelength, and the filter thickness $t_f$. This relationship is set forth in Equation A:

(A) $$I_c = I_{oc} e^{-\mu_c t_f}$$

Similarly, the intensity of the background fluorescent and backscattered radiation $I_b$ transmitted by the filter is a function of the intensity of the background radiation $I_{ob}$ available at the surface of the filter, the effective absorption coefficient $\mu_b$ of the filter for the background radiation and the thickness $t_f$ of the filter. The effective absorption coefficient $\mu_b$ is defined to be the sum of the products of the absorption coefficient for each wavelength, present in the background radiation, times the relative energy present at each respective wavelength. This relationship is described in Equation B:

(B) $$I_b = I_{ob} e^{-\mu_b t_f}$$

Both $I_{oc}$ and $I_{ob}$ are functions of the intensity of the primary beam $I_p$. Thus the relationships existing between $I_{oc}$ and $I_{ob}$ and $I_p$ are set forth in Equation C:

(C) $$I_{oc} = K_1 I_p$$
$$I_{ob} = K_2 I_p$$

where $K_1$ and $K_2$ are constants determinable from the particular element present in both the coating and the base of the specimen.

The signal-to-background ratio of the signal $K_3$ can then be described as set forth in Equation D:

(D) $$K_3 = I_c / I_b$$

By substitution of appropriate variables of Equations A, B and C into Equation D, the signal-to-background ratio $K_3$ can be further defined as set forth in Equation E:

(E) $$K_3 = \frac{K_1 e^{(\mu_b - \mu_c) t_f}}{K_2}$$

As discussed hereinbefore, the transmitted fluorescent radiation $I_{oc}$ must be at a level which is greater than detector noise level ($N_D$) so as to be discernible. The relationship between the levels can be designated as a factor $K_4$ and is set forth in Equation F:

(F) $$K_4 = \frac{I_d}{N_D} = \frac{K_1 I_p e^{-\mu_c t_f}}{N_D}$$

The selection criterion for the filter with respect to the background radiation is $K_3$ as described in Equation E and the filter criterion with respect to detector noise is $K_4$ as described in Equation F.

In every application, values may be selected for $K_3$ and $K_4$. The values for $K_1$ and $K_2$ can be derived empirically thereby permitting selection of: (a) the necessary filter thickness $t_f$; and (b) the requisite primary beam intensity $I_p$. Conversely, for a given system with a fixed maximum value of $I_p$, these equations will permit investigation of the effects of filter thickness on signal-to-background ratio, $K_3$, and signal-to-noise ratio, $K_4$.

Considering the graph of FIGURE 3, a series of absorption curves for zinc, nickel and iron are illustrated. Additionally, the $K\alpha_1$ fluorescent radiation of each element is illustrated at its characteristic wavelength. For the purposes of illustrating the filter operation, $K\alpha_1$ fluorescent radiation at the appropriate characteristic wavelength is shown for elements copper and nickel. In FIGURE 3, the zinc, nickel and iron absorption curves are shown as curves 60, 62 and 64 respectively. The corresponding fluorescent radiation lines for zinc, nickel and iron are shown as lines 66, 68 and 70 respectively. The $K\alpha_1$ fluorescent radiation lines for copper are shown as line 72.

The following table illustrates the atomic number, the $K\alpha$ fluorescent radiation characteristic wavelength and the absorption edge wavelength for each element described above and such data is set forth in a book entitled, "X-Ray Absorption and Emission in Analytical Chemistry," by H. A. Liebhafsky published in 1960 by John Wiley & Sons Inc.

| Element | Atomic number | $K\alpha$, wavelength | Absorption edge, wavelength |
|---|---|---|---|
| Iron (Fe) | 26 | 1.936 | 1.743 |
| Nickel (Ni) | 28 | 1.658 | 1.488 |
| Copper (Cu) | 29 | 1.541 | 1.380 |
| Zinc (Zn) | 30 | 1.435 | 1.283 |

Each of the absorption edges and the fluorescent radiations are illustrated at their appropriate wavelengths. The non-dispersive filtering step can be described by assuming that the filter has a predetermined thickness $t$ and that the excitation potential of the X-ray beam is sufficient to excite the selected coating element to fluorescence yielding fluorescent radiation of the coating element at its characteristic wavelength. The intensity of the fluorescent radiation is proportional to the mass of the coating element in the localized area of the coating irradiated by the X-ray beam.

For the purposes of example, assume that the coating element to be excited to fluorescence is zinc and that the base material the coating is applied to is the element copper. Zinc has an atomic number of 30 and copper has an atomic number of 29, thus the coating element is at least one atomic number higher than the base. The filter would be selected to be preferably zinc. However, the filter could be an element which has an X-ray absorption edge wavelength which is slightly shorter than the characteristic wavelength of the coating element. The zinc absorption curve 60 illustrates that the zinc absorption edge wavelength is slightly shorter than the characteristic wavelength of its fluorescent radiation, which fluorescent radiation is illustrated by line 66. The copper fluorescent radiation, which would be excited due to the excitation potential of the X-ray beam, would occur at a wavelength shown as line 72. The filter would receive both the zinc $K\alpha$ fluorescent radiation, the copper background fluorescent radiation and backscattered X-ray beam radiation. The backscattered X-ray beam radiation will have a wavelength which is slightly shorter than the absorption edge wavelength of zinc. The zinc filter will selectively transmit its fluorescent radiation at its characteristic wavelength with a known percent of absorption, the percent relative absorption being illustrated as level 80 on the graph of FIGURE 3. Simultaneously, the filter will selectively transmit a portion of the background fluorescent radiation from the copper with a greater percent of absorption and at a percent absorption as indicated by level 82. Concurrently, the filter will selectively transmit the backscattered X-ray beam radiation with a greater percent absorption as shown by level 84. Thus, for a filter of a certain thickness and for a given excitation potential, which in this example was an excitation potential sufficient to excite zinc to fluorescence, an optimum ratio is established between the transmitted fluorescent radiation and the transmitted background and backscattered radiation at the excitation potential of the X-ray beam for the filter thickness and the absorption coefficients thereof such that the transmitted fluorescent radiation is at a predetermined higher level than the combination of the transmitted background and backscattered radiation.

Equation E illustrates that the signal-to-background ratio is dependent on the difference in absorption coefficients ($\mu_b$ and $\mu_c$) for the selected filtering of the fluorescent radiation and the background and backscattered radiation. From the graph of FIGURE 3, the difference between the absorption coefficients ($\mu_b$ and $\mu_c$) for the selected filter is always positive for radiation from elements of lower atomic number in the coating and base relative to radiation from the selected coating element. Further, the difference increases with an increasing difference in atomic numbers. Therefor, the filter as herein described can always be chosen with respect to both the filter element material and filter thickness such that the filter will transmit the background and backscattered radiation from the coating and base at a predetermined lower level than the fluorescent radiation from the selected coating element thereby permitting determination of the ratio of transmittances or absorption by the selected filter element of the different radiations.

Thus, as the difference in atomic number between the coating element and base element increases, the filter becomes more effective in enhancing the ratio of fluorescent radiation to background and backscattered radiation.

Selection of a filter based on the above criterion is useful in monitoring the mass per unit area of a thin coating on paper. In one application, a silver bearing compound dispersed in a matrix of organic binding materials, all of which are of a much lower atomic number than silver, is coated onto a paper base. In addition to silver, a titanium dioxide whitener is added to the compound. A trace element, such as zinc oxide, is added to the compound in proportion to the amount of silver, for example a proportion of 10% zinc oxide to silver, such that a variance in the mass per unit area of the zinc oxide is proportional to the variance in mass per unit area of the silver.

The zinc, having an atomic number of 30, is excited to fluorescence by an appropriate X-ray beam having an excitation wavelength which is slightly shorter than the characteristic wavelength of the zinc. The X-ray beam will also excite the titanium, having an atomic number of 22, to fluorescence. The $K\alpha_1$ of titanium occurs at a wavelength of 2.748 Angstroms and is illustrated as line 90 on FIGURE 3.

By selecting a zinc filter, corresponding to absorption curve 62 on FIGURE 3, the absorption coefficient for the zinc fluorescent radiation is illustrated as level 80 while the absorption coefficient for the titanium fluorescent radiation is illustrated as level 92. Thus, the zinc filter transmits the zinc fluorescent radiation with a high signal-to-background ratio as described by Equation E.

In the above example, a self-filter, i.e. a zinc filter for transmitting zinc fluorescent radiation, is described. However in certain applications, it may be advantageous to select the filter to be one, two or a few atomic numbers higher or lower, providing that the filter has an absorption edge wave length which is slightly shorter than the coating element characteristic wavelength, in particular, the $K\alpha_1$, to be transmitted.

In certain applications, selection of a filter is limited by practical considerations to an element having an atomic number one, two or a few atomic numbers lower than the self-filter thereby permitting transmittance of the $K\alpha_1$ characteristic radiation at an acceptable signal-to-background ratio at the expense of absorbing the $K\beta_1$ and $K\beta_2$ characteristic radiation. Alternatively, the filter could be selected to be an element having an atomic number one, two or a few atomic numbers higher if the physical chemical characteristics or the costs prohibit use of the desired element as a self-filter.

In summary, the single passive filter is selected to be an element having a predetermined thickness and an X-ray absorption edge wavelength slightly shorter than at least one of the characteristic wavelengths of the coating element emitted to fluorescence. The predetermined thickness of the filter is selected such that the filter selectively transmits the fluorescent radiation of the coating element at its characteristic wavelength with a known percent of absorption and background fluorescent radiation from all the other elements in the coating material and base with a greater percent of absorption to establish a substantially optimum ratio between the transmitted fluorescent radiation to the transmitted background and backscattered radiation at the excitation potential of the X-ray beam for the filter thickness and the absorption coefficients thereof, such that the transmitted fluorescent radiation is at a predetermined higher level than the combination of the transmitted background and backscattered radiation.

Having thus described the present invention, it is to be understood that various modifications will be apparent to one having ordinary skill in the art, and all such changes are contemplated as may come within the scope of the appended claims and any equivalents thereof.

What is claimed is:

1. A method of determining the mass of a coating element of a coating on a base, said coating element having an atomic number which is at least one atomic number higher than any other element in the coating on said base and any other element in said base, said method comprising the steps of (a) irradiating a localized area of said coating with an X-ray beam having an excitation potential sufficient to excite said coating element to emit fluorescent radiation at its characteristic wavelengths, the intensity of said radiation being proportional to the mass of said coating element in the said localized area of said coating, while simultaneously producing background fluorescent radiation from any other elements in said coating and said base, and simultaneously producing backscattered X-ray beam radiation;

(b) non-dispersively filtering all said radiation through a filter having an X-ray absorption edge wavelength slightly shorter than at least one of said characteristic wavelengths of the fluorescent radiation of said coating element, whereby at least one of the characteristic wavelengths of said fluorescent radiation from said coating element is transmitted with a known percent absorption and said background and backscattered radiation are transmitted with a greater percent absorption, said filter being selected to establish a substantially optimum ratio of transmitted characteristic wavelength of fluorescent radiation as compared to the transmitted background and backscattered radiation at said excitation potential of the X-ray beam for the thickness and absorption coefficients of the filter, such that the transmitted characteristic wavelength of fluorescent radiation of said coating element is at a predetermined higher level than the combination of said transmitted background and backscattered radiation;

(c) detecting the non-dispersively filtered characteristic wavelength of fluorescent radiation transmitted by said filter and producing an output signal which is substantially proportional to the intensity of said detected fluorescent radiation of said coating element, said output signal being substantially representative of the amount per unit area of the coating element on the base; and (d) comparing said output signal with a reference signal produced from a reference coated base having a known mass per unit area of said coating element on said reference coated base to determine the variance of the mass per unit area of the coating element on said base with respect to the mass per unit area of the coating element on said reference coated base.

2. The method of claim 1 wherein the coating on the base solely consists of the coating element.

3. The method of claim 1 wherein the coating element is zinc.

4. The method of claim 1 wherein the coating element is essentially uniformly distributed throughout the composition of the material forming the coating on the base.

5. A method of determining the mass per unit area of a coating element of a coating on a base, said coating element being essentially uniformly distributed therethrough and having an atomic number which is at least one atomic number higher than any other element in the coating on said base and any other element in said base, said method comprising the steps of (a) irradiating a localized area of said coating with an X-ray beam having an excitation potential sufficient to excite the coating element to emit fluorescent radiation at its characteristic wavelengths, the intensity of said radiation being proportional to the mass of said coating element in the said localized area of said coating, while simultaneously producing background fluorescent radiation from any other elements in said coating and base, and simultaneously producing backscattered X-ray beam radiation;

(b) non-dispersively filtering all said radiation through a filter selected to be a filter element which is at least one atomic number higher than said coating element, said filter element being of a predetermined thickness and having an X-ray absorption edge wavelength slightly shorter than at least one of said characteristic wavelengths of the fluorescent radiation of said coating element, whereby at least one of the characteristic wavelengths of the fluorescent radiation from said coating element is transmitted with a known percent absorption and said background and backscattered radiation are transmitted with a greater percent absorption, said filter predetermined thickness being selected to establish a substantially optimum ratio of transmitted characteristic wavelength of fluorescent radiation as compared to the transmitted background and backscattered radiation at said excitation potential of the X-ray beam for the thickness and absorption coefficients of the filter such that the transmitted characteristic wavelength of fluorescent radiation of said coating element is at a predetermined higher level than the combination of said transmitted background and backscattered radiation;

(c) detecting the non-dispersively filtered characteristic wavelength of fluorescent radiation transmitted by said filter and producing an output signal which is substantially proportional to the intensity of said detected fluorescent radiation of said coating element, said output signal being substantially representative of said mass per unit area of said coating element on the base; and (d) comparing said output signal with a reference signal produced from a reference coated base having a known mass per unit area of said coating element on said reference coated base to determine the variance of the mass per unit area of the coating element on said base with respect to the mass per unit area of the coating element on said reference coated base.

6. The method of claim 5 wherein the coating element is zinc and the base is a non-metallic base.

7. A method of determining the mass per unit area of coating element of a coating on a base, said coating element being essentially uniformly distributed therethrough as a trace element and having an atomic number which is at least one atomic number higher than any other element in the coating on said base and any other element in said base, said method comprising the steps of (a) irradiating a localized area of said coating with an X-ray beam having an excitation potential sufficient to excite said trace element to emit fluorescent radiation at its characteristic wavelengths, the intensity of said radiation being proportional to the mass of said trace element in the said localized area of said coating, while simultaneously producing background fluorescent radiation from any other elements in said coating and base, and simultaneously producing backscattered X-ray beam radiation;

(b) non-dispersively filtering all said radiation through a filter having a predetermined thickness and an X-ray absorption edge wavelength slightly shorter than at least one of said characteristic wavelengths of the fluorescent radiation of said trace element, whereby at least one of the characteristic wavelengths of said fluorescent radiation from said trace element is transmitted with a known percent absorption and said background and backscattered radiation are transmitted with a greater percent absorption, said filter predetermined thickness being selected to establish a substantially optimum ratio of transmitted characteristic wavelength of fluorescent radiation as compared to the transmitted background and backscattered radiation at said excitation potential of the X-ray beam for the thickness and absorption coefficients of the filter such that the transmitted characteristic wavelength of fluorescent radiation of said trace element is at a predetermined higher level than the combination of said transmitted background and backscattered radiation;

(c) shielding said filter to prevent leakage of said X-ray beam directly through said filter;

(d) detecting the non-dispersively filtered characteristic wavelength of fluorescent radiation transmitted by said filter and producing an output signal which is substantially proportional to the intensity of said detected fluorescent radiation intensity of said trace element, said output signal being substantially representative of said mass per unit area of the trace element on the base; and (e) comparing said output signal with a reference signal produced from a reference coated base having a known mass per unit area of said trace element on the reference coated base to determine the variance of the mass per unit area of the trace element on said base with respect to the mass per unit area of the trace element on said reference coated base.

8. A non-dispersive X-ray fluorescent gauge for measuring mass per unit area of a coating element of a coating on a base, said coating element having an atomic number which is at least one atomic higher than any other element in the coating on said base and any other element in said base, said gauge comprising (a) an X-ray beam positioned to irradiate a localized area of said coating on the base and having an excitation potential sufficient to excite said coating element to emit fluorescent radiation at its characteristic wavelengths, the intensity of said radiation being proportional to the mass of said coating element in the said localized area of the coating, while simultaneously producing background fluorescent radiation from any other elements in said coating and base, and simultaneously producing backscattered X-ray beam radiation;

(b) a single passive filter comprising a preselected element having a predetermined thickness and an X-ray absorption edge wavelength slightly shorter than at least one of said characteristic wavelengths of the fluorescent radiation of said coating element, said predetermined thickness being selected such that said filter selectively transmits at least one of said characteristic wavelengths of fluorescent radiation at its characteristic wavelength with a known percent of absorption and said background and backscattered radiation with a greater percent of absorption to establish a substantially optimum radio therebetween at said excitation potential of the X-ray beam, said filter being positioned at an angular displacement relative to said X-ray beam and adjacent said irradiated localized area of the coating for selectively transmitting the characteristic wavelength of fluorescent radiation at said substantially optimum ratio; and (c) a detector positioned relative to said filter for receiving the transmitted characteristic wavelength of the fluorescent radiation of said coating element and producing an output signal which is substantially proportional to the intensity of said detected fluorescent radiation intensity of said coating element, said output signal being substantially representative of said mass per unit area of the coating element on the base being measured by said gauge.

9. The gauge of claim 8 in which the X-ray beam has an excitation potential sufficient to excite zinc as the coating element on a non-metallic base.

10. A non-dispersive X-ray fluorescent gauge for measuring mass per unit area of a coating element of a coating on a base, said coating element having an atomic number which is at least one atomic number higher than any other element in the coating on said base and any other element in said base, said gauge comprising (a) an X-ray beam positioned to irradiate a localized area of said coating on the base and having an excitation potential sufficient to excite said coating element to emit fluorescent radiation at its characteristic wavelengths, the intensity of said radiation being proportional to the mass of said coating element in the said localized area of the coating, while simultaneously producing background fluorescent radiation from any other elements in said coating and base, and simultaneously producing backscattered X-ray beam radiation;

(b) a single passive filter comprising a preselected element which is at least one atomic number higher than the coating element and having a predetermined thickness and an X-ray absorption edge wavelength slightly shorter than at least one of said characteristic wavelengths of the fluorescent radiation of said coating element, said predetermined thickness being selected such that said filter selectively transmits at least one of said characteristic wavelengths of the fluorescent radiation at its characteristic wavelength with a known percent of absorption and said background and backscattered radiation with a greater percent of absorption to establish a substantially optimum ratio therebetween at said excitation potential of the X-ray beam, said filter being positioned at an angular displacement relative to said X-ray beam and adjacent said irradiated localized area of the coating for selectively transmitting the characteristic wavelength of fluorescent radiation at said substantially optimum ratio; and (c) a detector positioned relative to said filter for receiving the transmitted characteristic wavelength of fluorescent radiation of said coating element and producing an output signal which is substantially proportional to the intensity of said detected fluorescent radiation of said coating element, said output signal being substantially representative of said mass per unit area of the coating element on the base being measured by said gauge.

11. A non-dispersive X-ray fluorescence gauge for measuring mass per unit area of a coating element of a coating on a base, said coating element being a trace element having an atomic number which is at least one atomic number higher than any other element in the coating on said base and any other element in said base, said gauge comprising (a) an X-ray beam positioned to irradiate a localized area of said coating on the base and having an excitation potential sufficient to excite said trace element to emit fluorescent radiation of said element at its characteristic wavelengths, the intensity of said radiation being proportional to the mass of said trace element in the said localized area of the coating, while simultaneously producing background fluorescent radiation from any other elements in said coating and base, and simultaneously producing backscattered X-ray beam radiation;

(b) a single passive filter comprising a preselected element having a predetermined thickness and an X-ray absorption edge wavelength slightly shorter than at least one of said characteristic wavelengths of the fluorescent radiation of said coating element, said predetermined thickness being selected such that said filter selectively transmits at least one of said characteristic wavelengths of the fluorescent radiation at its characteristic wavelength with a known percent of absorption and said background and backscattered radiation with a greater percent of absorption to establish a substantially optimum ratio therebetween at said excitation potential of the X-ray beam, said filter being positioned at an angular displacement relative to said X-ray beam and adjacent said irradiated localized area of the coating for selectively transmitting the characteristic wavelength of fluorescent radiation at the said substantially optimum ratio;

(c) a shield disposed between said X-ray beam and said filter for preventing leakage of said X-ray beam directly through said filter; and (d) a detector positioned relative to said filter for receiving the transmitted characteristic wavelength of fluorescent radiation of said coating element and producing an output signal which is substantially proportional to the intensity of said detected fluorescent radiation of said coating element, said output signal being substantially representative of said mass per unit area of the coating element on the base being measured by said gauge.

12. Apparatus for selectively measuring fluorescent radiation intensity and including an X-ray beam having an excitation potential sufficient to excite a selected element in a binder on a base, wherein the selected element has an atomic number which is at least one atomic number higher than any other element in said base so as to emit fluorescent radiation at its characteristic wavelengths, said fluorescent radiation occurring in the presence of background fluorescent radiation and backscattered X-ray beam radiation, said apparatus comprising (a) a single passive filter comprising a preselected element having a predetermined thickness and an X-ray absorption edge wavelength slightly shorter than at least one of said characteristic wavelengths, said predetermined thickness being selected such that said filter selectively transmits at least one of said characteristic wavelengths of the fluorescent radiation at its characteristic wavelength with a known percent of absorption and transmits said background and backscattered radiation with a greater percent of absorption to establish a substantially optimum ratio therebetween at said excitation potential of the X-ray beam, said filter absorbing a greater percent of said background radiation than the intensity of said detected fluorescent radiation of said selected element for every wavelength of background radiation being longer than said characteristic wavelength; and (b) a detector positioned relative to said filter for receiving said transmitted fluorescent radiation of said selected element and producing an output signal which is substantially proportional to said selected fluorescent radiation intensity.

13. Apparatus for selectively measuring fluorescent radiation intensity and including an X-ray beam having an excitation potential sufficient to excite a selected element in a binder on a base, wherein the selected element has an atomic number which is at least one atomic number higher than any other element in said base so as to emit fluorescent radiation at its characteristic wavelengths, said fluorescent radiation occurring in the presence of background fluorescent radiation and backscattered X-ray beam radiation, said apparatus comprising (a) a single passive filter comprising a preselected element having a predetermined thickness and an X-ray absorption edge wavelength slightly shorter than at least one of said characteristic wavelengths, said predetermined thickness being selected such that said filter selectively transmits at least one of said characteristic wavelengths of the fluorescent radiation at its characteristic wavelengths with a known percent of absorption and transmits said background and backscattered radiation with a greater percent of absorption to establish a substantially optimum ratio therebetween at said excitation potential of the X-ray beam, said filter absorbing a greater percent of said background radiation than the intensity of said detected fluorescent radiation of said selected element for every wavelength of background radiation being longer than said characteristic wavelength;

(b) a shield disposed between said X-ray beam and said filter for preventing leakage of said X-ray beam directly through said filter; and (c) a detector positioned relative to said filter for receiving said transmitted fluorescent radiation of said selected element and producing an output signal which is substantially proportional to said selected fluorescent radiation intensity.

References Cited

UNITED STATES PATENTS 2,926,257    2/1960    Friedman _____ 250—83.3 X

RALPH G. NILSON, *Primary Examiner.*

A. B. CROFT, *Assistant Examiner.*

U.S. Cl. X.R.

250—51.5, 86

UNITED STATES PATENT OFFICE
CERTIFICATE OF CORRECTION

Patent No. 3,417,243　　　　　Dated　December 17, 1968

Inventor(s)　ROBERT C. HILL

It is certified that error appears in the above-identified patent and that said Letters Patent are hereby corrected as shown below:

Column 3, line 75, change "characteristics" to --characteristic--; Column 4, line 45, change "fluorescene" to --fluorescence--; Column 4, line 50, change "an" to --a--Column 5, line 72, change "fluorsecence" to --fluorescence--Column 6, line 46, change "radiaion" to --radiation--; Column 7, line 59, change "$I_d$" to --$I_c$--; Column 9, line 62, change "wave length" to --wavelength--; Column 12, line 75, change "radio" to --ratio--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents